United States Patent [19]

Graham et al.

[11] 4,183,118
[45] Jan. 15, 1980

[54] OIL BAG REMOVER

[76] Inventors: Kenneth Graham, Rte. 2, Dawsonville, Ga. 30534; John Graham, Rte. 8, Gainesville, Ga. 30501

[21] Appl. No.: 890,603

[22] Filed: Mar. 20, 1978

[51] Int. Cl.² ............................................. A22C 21/00
[52] U.S. Cl. ......................................... 17/52; 17/11
[58] Field of Search .............................. 17/11, 12, 52

[56] References Cited

U.S. PATENT DOCUMENTS

| | | | |
|---|---|---|---|
| 3,159,872 | 12/1964 | Hill | 17/11 X |
| 3,417,424 | 12/1968 | Chamberlain | 17/11 |
| 3,744,087 | 7/1973 | Vertegaal | 17/11 |
| 3,806,988 | 4/1974 | Harben, Jr. | 17/11 |

*Primary Examiner*—Willie G. Abercrombie
*Attorney, Agent, or Firm*—Jones, Thomas & Askew

[57] ABSTRACT

Birds are conveyed in a suspended series through a poultry processing plant in a legs and tail up attitude, and a series of bird support brackets are moved down an incline from above the path of the birds in timed relationship with the movement of the birds and the birds are guided to the bird support brackets until the bird support brackets at least partially support and guide the birds. Each bird support bracket comprises an upper and lower horizontal plate and a vertical plate joining the two horizontal plates giving the bracket an approximately Z-shape, and a pair of downwardly extending side leg members are mounted to the support bracket on opposite sides of the lower plate at the intersection of the lower plate and the vertical plate. As the birds and support brackets continue their movement, a rotatable cutting disc which defines a series of peripheral notches engages and severs the oil bag tissue from the birds.

13 Claims, 8 Drawing Figures

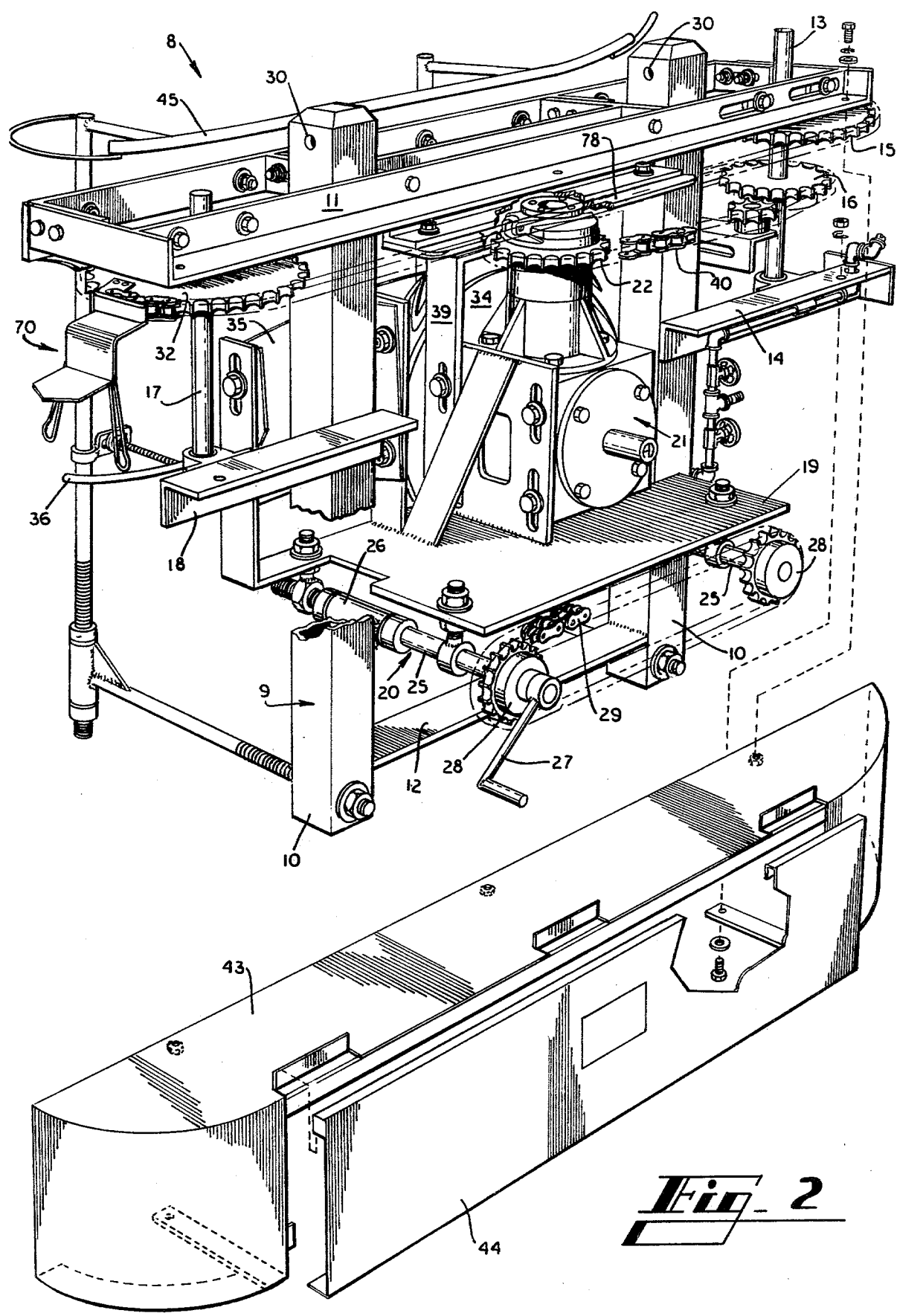
Fig_2

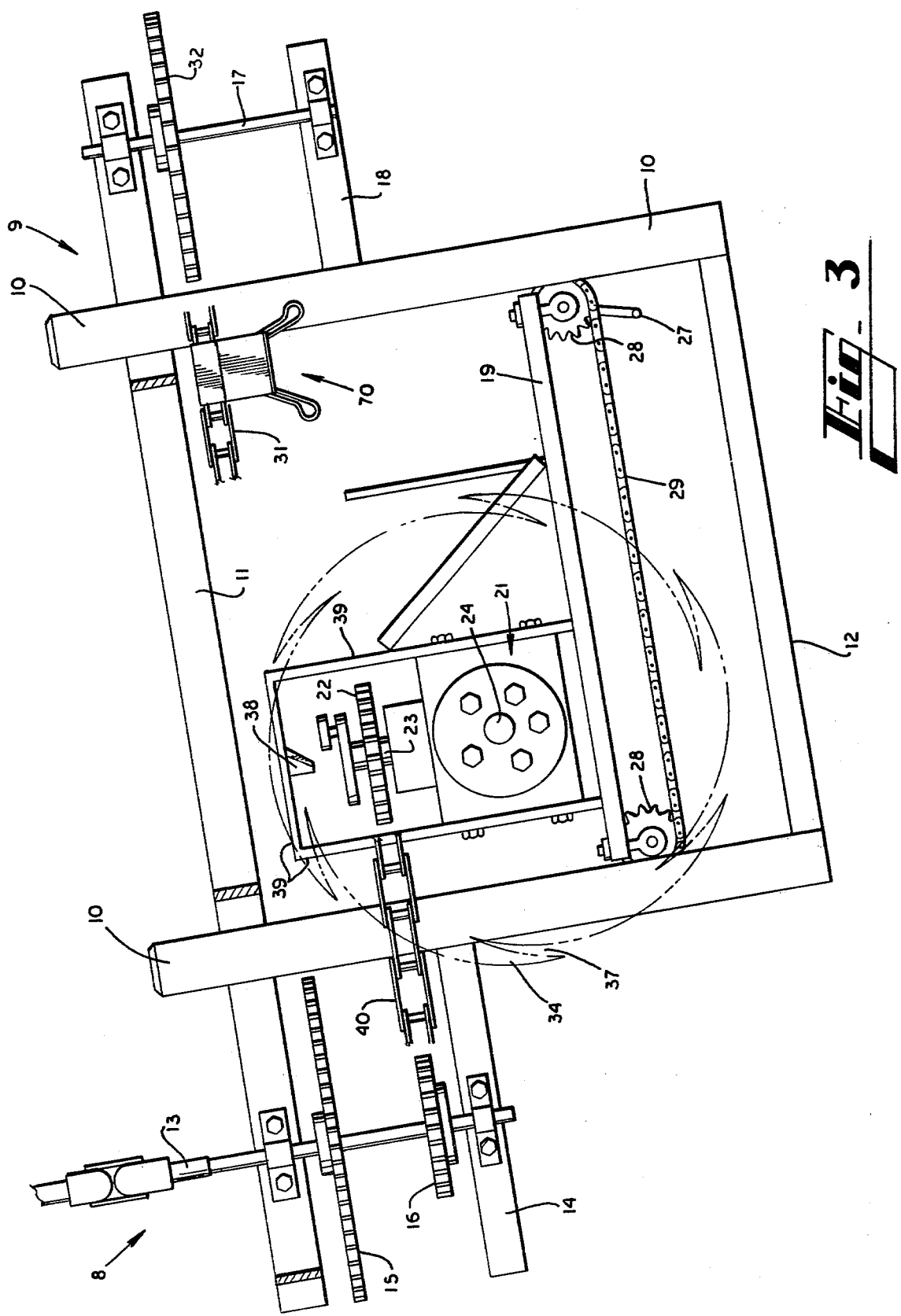

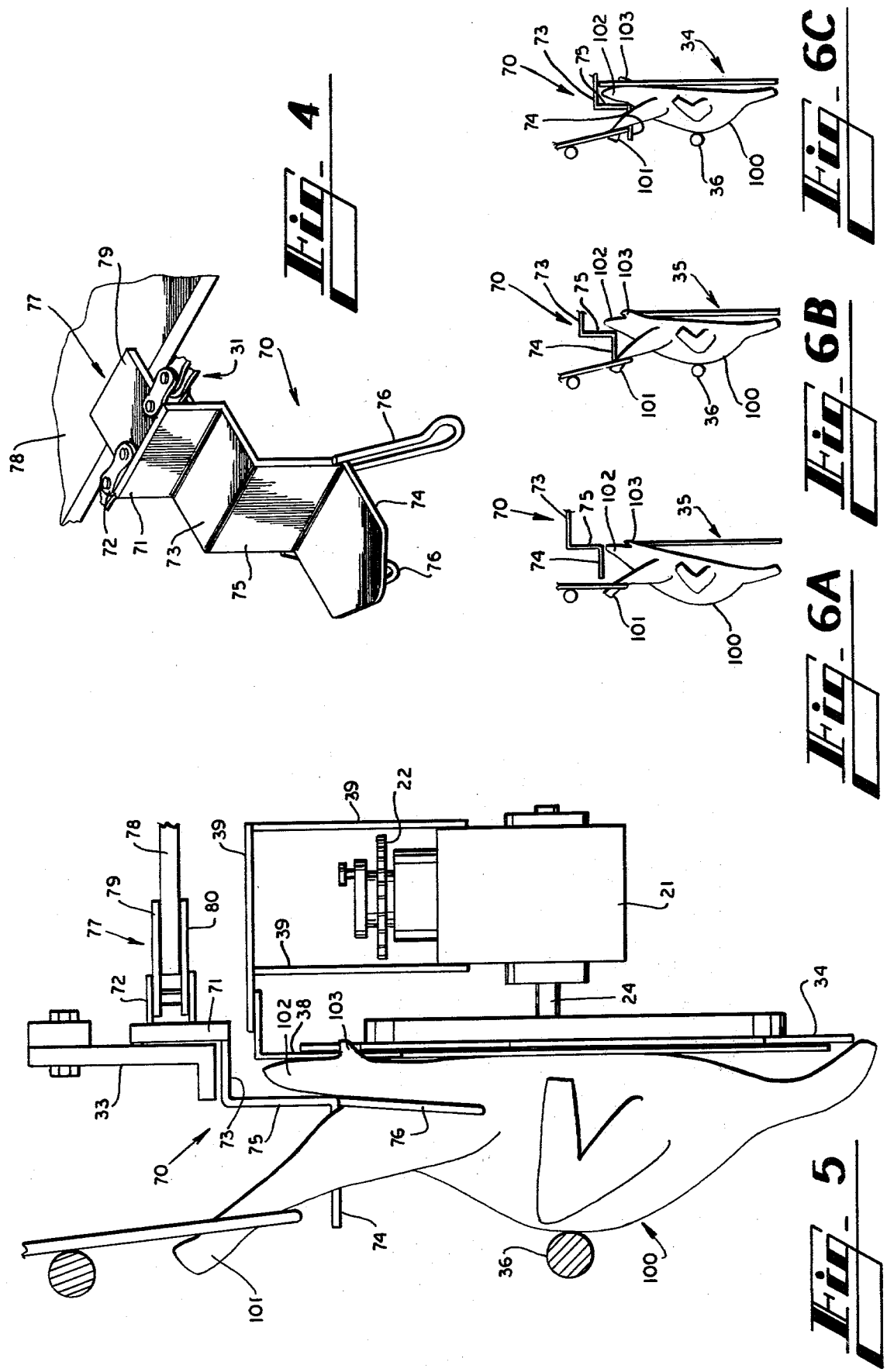

OIL BAG REMOVER

BACKGROUND OF THE INVENTION

In the poultry industry where chickens and other type birds are processed for consumption by the removal of feathers, feet, head, viscera, etc., it is desirable to move the birds rapidly through the processing steps with as little interruption as possible while effectively processing the birds. Most poultry processing plants utilize overhead conveyor systems where the birds are suspended by their legs from shackles in a legs-up attitude, and the shackles which are closely spaced from one another are progressively moved by the conveyor system through the various work stations in the processing plant.

Various automatic oil bag removing machines have been developed and utilized in the past on poultry processing lines; however, the prior art machines have been complicated with numerous moving parts. There are frequent breakdowns and the complicated nature of the machines along with the need for numerous repair parts result in long repair waits and the processor is sometimes required to shut down an entire processing line because of the malfunction of a single piece of equipment. Maintenance on the prior art machines can be very expensive and is often so difficult the poultry processor is not able to undertake maintenance of the equipment by himself. Also, some of the prior art machines are ineffective to properly cut off the oil bags, or are wasteful, cutting away, along with the oil bag, more of the edible chicken meat than necessary.

SUMMARY OF THE INVENTION

Briefly described, the present invention comprises a poultry processing system wherein the oil bags of a series of birds moving on a continuous processing line in closely spaced relationship are accurately cut away from the tails of the birds substantially without removing excessive amounts of edible flesh from the birds and without impeding the movement of the processing line.

A series of bird support brackets move in equally spaced relationship to one another down an incline in timed relationship with the movement of the suspended birds along the processing line. Each bird is guided into engagement with a bird support bracket and the brackets engage and at least partially support and guide the bodies of the birds so that the backs of the birds achieve an appromixately upright attitude. Then the birds and support brackets move toward the cutting system which comprises a rotating disc with a series of grooves along its periphery and a stationary blade. One of the grooves in the periphery of the rotating disc catches the oil bag of a bird and the oil bag is removed from the bird with a scissors action as the groove of the rotating disc passes the stationary blade.

There is no noticeable interference with the movement of the birds along the path of the conveyor line. The oil bag removing system of the present invention has relatively few moving parts and is therefore easily serviced and kept clean. There are few parts to break down and the system is uncomplicated and therefore easily understood by the poultry processor.

Thus, it is an object of the present invention to provide a poultry processing system for use in connection with an overhead poultry processing plant wherein the oil bags of birds are accurately, expediently and rapidly cut from the bird with a minimum of waste of edible chicken flesh and without interfering with the movements of the conveyor system.

Another object of this invention is to provide an improved oil bag removal system for use in a poultry processing plant wherein birds are received in closely spaced sequence along an approximately rectilinear path and the oil bags removed from the birds substantially without interfering with the movement of the birds along the path.

It is also an object of this invention to provide an oil bag removing system for use in a poultry processing plant which requires a minimum of repair cost, which is easily serviced and kept clean and which is uncomplicated and easily understood by the poultry processor.

Other objects, features and advantages of the present invention will become apparent from reading the following specification, when taken in conjunction with the accompanying drawings.

BRIEF DESCRIPTION OF THE DRAWINGS

FIG. 2 is a rear perspective view of the oil bag removal system taken from the side opposite to the side illustrated in FIG. 1.

FIG. 3 is a front elevational view of the oil bag removal system with the guide shield and rotatable cutting disc removed.

FIG. 4 is an perspective view of the bird support bracket with its mounting and guide system.

FIG. 5 is an isolated view of the cutting apparatus of the oil bag removal system.

FIGS. 6A, 6B and 6C show in sequence how birds are moved to the cutting disc.

DETAILED DESCRIPTION

Figure 1:
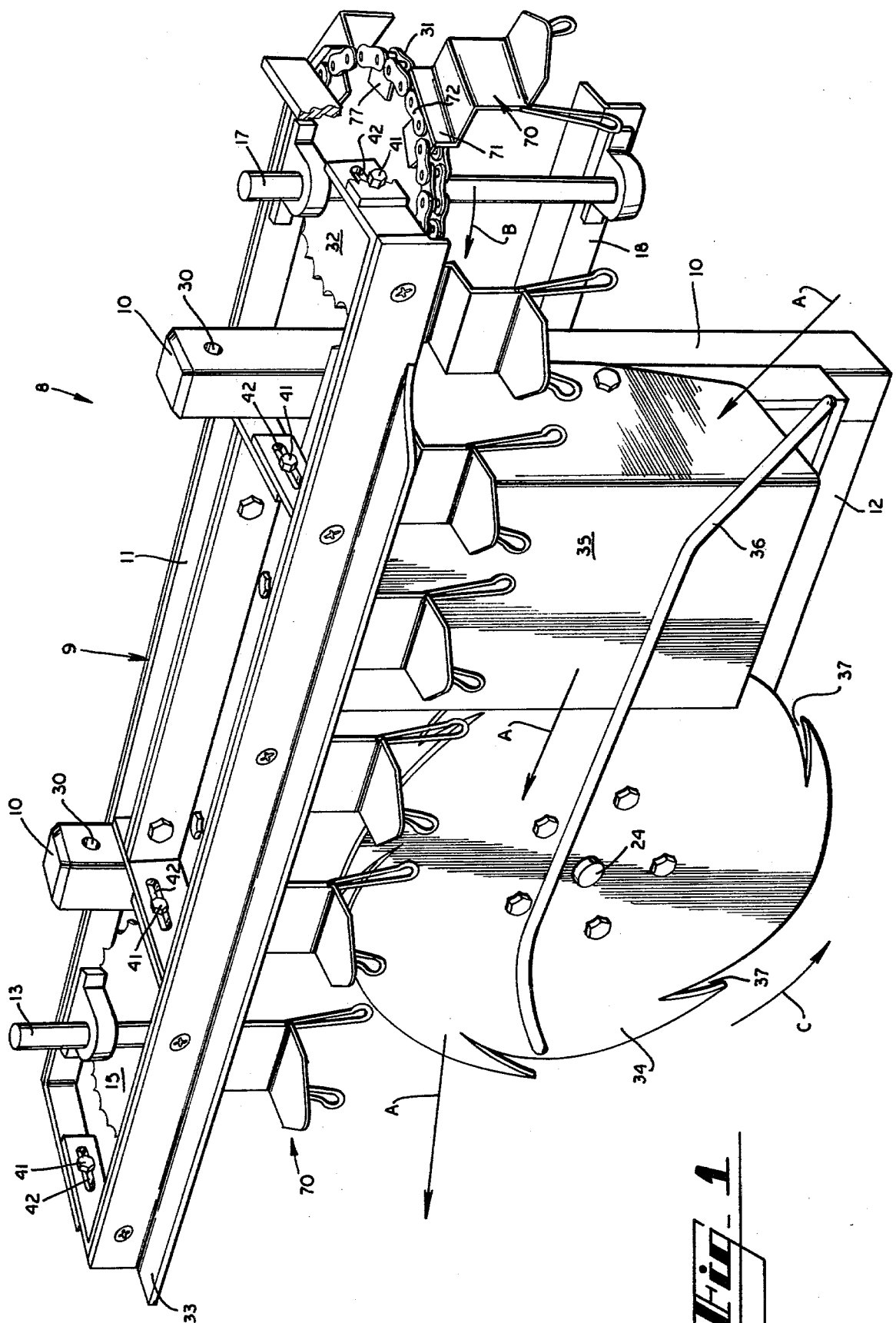
FIG. 1 is a front perspective view of the oil bag removal system according to the invention.

Referring now in more detail to the drawings, in which like numerals indicate like parts throughout the several views, FIGS. 1, 2 and 3 illustrate the oil bag remover 8 which includes a super structure or framework 9 which comprises two approximately vertical support columns 10, an upper horizontal cross brace 11 and lower horizontal cross brace 12. Drive axle 13 is mounted vertically to an extension of upper cross brace 11. Brace piece 14 aids in mounting the drive axle 13. Positioned on the drive axle 13 are chain drive sprocket 15 and power drive sprocket 16. At the opposite end of the super structure, a driven axle 17 is mounted to an extension of upper cross brace 11. Brace piece 18 aids in mounting this driven axle 17. Horizontal support plate 19 is attached to the super structure between the two support columns 10 and between the two cross braces 11, 12. The support plate 19 is mounted to the framework by use of adjustable track means 20 (see FIG. 2), by which the support plate 19 can be moved horizontally, that is, perpendicular to the plane defined by the two support columns 10. Supported on the support plate 19 is gear box 21 having power driven sprocket 22, input shaft 23 and output shaft 24. The gear box 21 moves with support plate 19. The adjustable track means 20 comprises two externally threaded rods or travel screws 25 to which the support plate 21 is attached. Each rod is threaded through an internally threaded socket 26 which is mounted on support columns 10. Adjustment gears 28 are located on one end of each threaded rod 25 and are connected by chain 29. A crank 27 is connected to one adjustment gear 28. When the crank 27 is rotated, the chain causes the travel screws to rotate in unison to move the support plate laterally with respect to the framework 9. The framework 9 is hung from overhead by insertng a pin or other hanging device through an opening 30 defined in the top ends of support columns 10.

The equipped framework 9 is illustrated in FIG. 1. A conveyor chain 31 connects chain driving sprocket 15 with chain driven sprocket 32 mounted on driven axle 17. A series of equally spaced bird support brackets 70 are located on conveyor chain 31 and move with the conveyor chain 31 in an elongated loop about the framework 9. Each bird support bracket 70 is attached to conveyor chain 31 by welding or the like to a vertical bracket mount 71 which is likewise welded or otherwise attached to a link 72 of conveyor chain 31. Other major equipment shown in FIG. 1 are a horizontal guide rail 33, the purpose of which will be discussed later in regards to FIG. 3, a rotatable disc 34 mounted on the output shaft 24 of gear box 21 (shown in FIG. 1), positioning shield 35 and positioning bar 36. Rotatable disc 34 has a plurality of spaced apart grooves 37 defined in the periphery. A stationary cutting blade 38 (seen in FIGS. 3 and 5) is mounted to a frame 39 attached to gear box 21 so that it is located over the upper portion of the rotatable disc 34 and extends down between the rotatable disc 34 and the bird support brackets 70.

Each bird support bracket 70, as best illustrated in FIG. 4, comprises an upper horizontal plate 73, a lower horizontal plate 74, and a vertical connecting plate 75. The three plates 73, 74, 75 are joined at right angles in such a way that they define a "Z" shape. Two support fingers 76 extend downward from the edges of vertical connecting plate 75 and from the point of intersection of vertical plate 75 and lower horizontal plate 74. The free end of the upper horizontal plate 73 adjoins vertical bracket mount 71 and is attached to the bracket mount 71 thus attaching the bird support bracket 70 to the conveyor chain 31. The bird support brackets 70 and the conveyor chain 31 to which the brackets 70 are attached as previously described are moved about the super structure 9 by chain driving sprocket 15 and chain driven sprocket 32. The conveyor chain 31 and brackets 70 are guided along their elongated loop path by a guide system comprising guide clips 77, chain guide rails 78 and bracket guide rail 33 (see FIG. 1) and chain driving and driven sprockets 15, 32 (see FIG. 1). A guide clip 77 is attached to the links 72 of the chain to which a bird support bracket 70 are also attached. Chain guide rails 78, of which there are two, are located between the two support columns 10, one rail 78 on each side of the vertical plane defined between the two support columns 10. The chain guide rails 78 are positioned horizontally within the same horizontal plane as is defined by the elongated loop of the conveyor chain 31 and are located inside the loop defined by conveyor chain 31. The guide clip 77 has an upper plate 79 and lower plate 80 which ride above and below the chain guide rail 78 respectively, and as a result prevent vertical motion of the conveyor chain 31 and support brackets 70. Bracket guide rail 33 is only located on one side of the super structure as seen in FIG. 1. This bracket guide rail 33 is L-shaped, as seen in FIG. 5, fitting the contour of the connection between the upper horizontal plate 73 of the bird support bracket 70 and the bracket mount 71. This bracket guide rail 33 prevents movement, which might result during the actual cutting process, in a horizontal plane perpendicular to the path of motion of the conveyor chain 31.

The oil bag removal system is operational as follows:

The assembly is hung, using holes 30 in support columns 10, from a scaffolding that is suspended from an overhead conveyor system. The conveyor system brings the poultry in sequence into the system. Drive axle 13 is driven from the same power source as the overhead conveyor system and is in timed relationship with the conveyor system. Rotating with drive axle 13 is chain driving sprocket 15 and power driving sprocket 16; chain driving sprocket 15 powers conveyor chain 31 which is carried on chain driving sprocket 15 and chain driven sprocket 32 and to which are attached bird support brackets 70; power driving sprocket 16 turns power driven sprocket 22 using power drive chain 40 (see FIG. 2) and in turn driving gear box 21 to which rotatable disc 34 is mounted at output shaft 24. As a result of this configuration, bird support bracket 70 and rotatable disc 34 are operated in timed relationship with one another and likewise in timed relationship with movement of the birds in sequence along the overhead conveyor system.

Birds moving in sequence along the conveyor system are channeled into the oil bag removable system by a channeling bar 45 (FIG. 2). The birds move in the direction indicated by arrows A of FIG. 1. Bird support brackets 70, moved in the direction of arrows B by conveyor chain 31, move into place to guide and position the birds. This is accomplished as follows (refer to FIGS. 1 and 6): each support bracket 70 moves in timed relationship with a bird 100 on the conveyor system; as each bird 100 is channeled along the path described by arrows A by positioning bar 36, a support bracket 70 moves into position behind the bird; the birds, as hung from the conveyor system, are in a legs up and tail up attitude with their breasts facing away from the oil bag removal machine and their backs facing the support bracket 70 and rotatable disc 34; the oil bag removal system is hung from the conveyor system at a slight angle (see FIG. 3) such that the plane of rotation of the conveyor chain 31 angles slightly downward from the horizontal plane in the direction of motion of the birds in the conveyor system; because of this incline, the support bracket 70 approaches the bird from above and gradually moves down into contact with the bird (see FIG. 6); lower horizontal plate 73 of support bracket 70 locates itself between the upwardly extended legs 101 of the bird while support fingers 76 locate themselves behind the legs 101 of the bird (see FIG. 5), that is, to the backside of the bird 100 between the legs 101 and the rotable disc 34, these fingers 76 keep the bird from swinging too far behind the bracket 70; the tail 102 is forced up and behind vertical connecting plate 75 of the support bracket 70; by the slight downward motion of the support bracket caused by the inclination of the oil bag remover 8, slight downward pressure is put on the bird thus forcing the tail 102 higher up behind the vertical connecting plate 75 thus giving the back of the bird a more vertical upright attitude and making the oil bag 103 more prominent and accesible; this positioning is aided by the action of positioning bar 36 which presses against the breast of the bird and thus swings the tail 102 up into position behind the support bracket 70 and also is aided by the flat surface of positioning shield 35 which serves as a backing surface to keep the back of the bird straight as it approaches the cutters (the cutters being rotatable disc 34 and stationary blade 38). This positioning shield 35 tends to keep the birds out of the blade of the rotatable disc 34. The bird, positioned and guided by the support bracket 70, moves continuously in the direction of arrows A towards the rotatable disc 34; the grooves 37 in rotatable disc 34 are positioned around the periphery of the rotatable disc 34 in such a way that combined with the synchronization of gear box 21 and conveyor chain 31, the grooves 37 move in timed relationship with the motion of the birds; as each bird 100 approaches the rotatable disc 34 one groove 37 moves into position behind each bird and eventually locates the oil bag 103 protruding from the tail of the bird; the groove locates the oil bag 103 just before the bird passes by stationary blade 38 (see FIG. 3); as the bird with its oil bag 103 cupped by the groove 37 passes stationary blade 38, the rotatable disc 34 and stationary blade 38 coact as cutting edges to snip the oil bag 103 from the tail of the bird. The cutting surfaces are not particularly sharp so as to avoid inadvertently cutting into the oil bag of the bird. After the oil bag has been removed, the bird, still attached to the conveyor system continues to move on out from the oil bag removal system. This process is repeated consecutively with each subsequent bird without stopping or slowing progression of the birds through the conveyor system.

The position of rotatable disc 34 and the stationary blade 38 in relationship to the vertical connecting plate 75 of the bird support bracket 70 can be adjusted closer or further away from the vertical connecting plate 75 by moving support plate 19 back and forth on the adjustable track means 20. This is accomplished by turning crank 27 which turns, with the aid of chain 29, both adjustment gears 28 simultaneously. This turns externally threaded rods 25 in their matching internally threaded brackets 26 which are mounted to the support columns 10. As the threaded rods move through the threaded brackets 26, support plate 19 which is attached to the threaded rod 25 moves back or forth with the threaded rod. In this way, the oil bag removal system can be adjusted to accommodate larger or smaller birds.

Bracket guide rail 33 is also adjustable in a horizontal plane perpendicular to the path of support brackets 70 as they move by the horizontal guide rail 33. This is accomplished by loosening the four bolts 41 and sliding the guide rail 33 in or out within the boundries of elongated screw holes 42.

Chain guard 43, which is shown in FIG. 2 as removed from the oil bag remover 8, serves to keep objects away from the drive mechanisms, i.e. chains 31 and 40, sprockets 15, 16, 22 and 32. An access panel 44 removably attached to the chain guard 43 makes inspection and maintenance of the drive mechanisms possible without disconnecting the entire guard 43.

While this invention has been described in detail with particular reference to preferred embodiments thereof, it will be understood that variations and modifications can be effected within the spirit and scope of the invention as described herein before and as defined in the appended claims.

We claimed:

1. The method of processing poultry and the like comprising continuously moving a series of birds in sequence suspended in a legs and tail up attitude along an approximately rectilinear path, and as the series of birds are continuously moved in sequence along the rectilinear path, the steps of continuously moving a series of bird support brackets in sequence along a downwardly inclined path from above the path of the birds toward the path of the birds in timed relationship with the movement of the birds until the bird support brackets extend between the legs of the birds and at least partially stabilize the birds as the birds continue to move along the path, tilting the birds further into the support brackets to orient the backs of the birds toward an approximately upright attitude, cutting the oil bag of each bird from the bird while the back of each bird is approximately upright.

2. The method of claim 1 and wherein the step of cutting the oil bag from the birds comprises rotating a disk about its center axis, progressively moving each of the birds toward the disk in such an attitude that the tail area bearing the oil bag of each bird makes contact with the rotating disk, catching the oil bag in one of a series of grooves formed in the rotating disc, removing the oil bag with a scissors action as the disc groove passes a stationary blade.

3. Method of claim 2 and further including the step of moving the grooves in the disc in coordinated relationship with the movement of the birds so that as each bird approaches the disk one groove of the disk makes contact with the connection between the oil bag and the body of the bird.

4. Method of claim 2 and wherein the step of rotating the disc comprises rotating the disc behind the stationary blade wherein the birds pass in front of the stationary blade and the rotating disc and stationary blade act in scissors motion as cutting edges to cut the oil bag from the bird.

5. Apparatus for processing poultry as a series of birds are moved in suspended, equally spaced, legs and tail up attitude along an approximately rectilinear path comprising a series of bird support brackets spaced from each other a distance approximately equal to the spacing of the birds, means for moving said bird support brackets along a path in timed relationship with the movement of the birds down an incline from generally above the path of the birds, said bird support brackets each comprising upper and lower horizontal surfaces intersected by a vertical surface, the three surfaces arranged in an approximate "Z" shape, and a finger extending down from each opposite side of the lower horizontal surface, and means mounting each of said support brackets at its upper horizontal surface to said means for moving the bird support brackets, means for urging each bird into engagement with a bird support bracket until each bird support bracket makes contact with and at least partially supports and positions a bird, and a means for cutting the oil bag from the body of each bird as each bird is at least partially supported by a bird support bracket.

6. Apparatus of claim 5 and wherein said bird support brackets are connected at their upper horizontal surface at intervals along a conveyor chain, said conveyor chain extending around at least two driving sprockets and extending along chain guides positioned in the path of said conveyor chain whereby said conveyor chain moves along said guides.

7. Apparatus for removing the oil bag from poultry as a series of birds are moved in suspended, equally spaced, legs and tail up attitude along an approximately rectilinear path comprising a conveyor chain and a series of bird support brackets mounted in spaced relationship on said conveyor chain, means for moving said conveyor clain and said series of support brackets along an inclined path toward the path of the birds, a rotatable disc cutter adjacent the path of the birds, a stationary blade cutting edge adjacent the periphery of said rotatable disc cutter, and bird guiding means for urging each bird into a position in its support bracket with its back approximately upright and toward said rotatable disc cutter.

8. Apparatus of claim 7 and wherein said plate cutting edge is mounted with its cutting edge parallel to the plane of rotation of said disc cutting edge.

9. Apparatus for removing oil bags from poultry wherein birds are suspended and moving in sequence along a predetermined path in a tail and legs-up attitude, said apparatus comprising a disc cutter rotatable about an axis approximately perpendicular to the path of movement of the birds, said disc cutter defining a series of spaced notches about its periphery with the opening of each notch angled toward the direction of rotation of the disc cutter, a stationary cutting element in juxtaposition with the periphery of said disc cutter, and means for swinging the birds moving along the predetermined path toward said disc cutter to place the oil bag of each bird in the path of a notch of the disc cutter, whereby the notches of the disc cutter are inserted about the oil bags of the bird and coact with the stationary cutting element to sever the oil bags from the birds.

10. In combination with a poultry processing conveyor line wherein a series of birds are suspended by their legs from an overhead conveyor system and moved in sequence along a predetermined path, a series of Z-shaped bird support brackets each comprising unitary upper and lower horizontal plates and a vertical plate joined at its upper and lower edges to the edges of said upper and lower plates, and a pair of side leg members with each leg member mounted to said bracket on opposite sides thereof at the intersection of said lower plate and said vertical plate and extending downwardly therefrom, and conveyor means for moving said brackets in sequence toward the path of the birds in timed relationship with the movement of the conveyor line, and means for moving the tails of the birds on the conveyor line behind the vertical plate and beneath the upper horizontal plate with the wings of the birds positioned in front of the legs of the bracket as the birds and brackets move along their respective paths.

11. Apparatus for processing poultry as a series of birds are moved in suspended, equally, spaced, legs and tail up attitude along an approximately rectilinear path comprising a series of bird support brackets spaced from each other a distance approximately equal to the spacing of the birds, means for moving said bird support brackets along a path in timed relationship with the movement of the birds down an incline from generally above the path of the birds, means for urging each bird into engagement with a bird support bracket until each bird support bracket means contact with and at least partially supports and positions a bird, and a means for cutting the oil bag from the body of each bird as each bird is at least partially supported by a bird support bracket, said means for cutting the oil bag from the body of each bird comprising a rotatable disc mounted adjacent the path of the bird support brackets, means for rotating said disc about its central axis in timed relationship with the movement of the birds along their path, grooves formed in the periphery of said rotatable disc in such position that the grooves contact the oil bags of the birds as the birds move along their path, a stationary blade mounted adjacent the periphery of said rotatable disc whereby the rotatable disc and stationary blade coact as cutting surfaces for cutting away the oil bag from each bird with a scissors motion as each bird moves along its path, said stationary blade being positioned such that a groove of said rotatable disc has located the oil bag of a bird at the time the groove arrives at said stationary blade.

12. Apparatus for processing poultry as a series of birds are moved in suspended, spaced, legs and tail up attitude along an approximately rectilinear path comprising a cutting disc including at least one slot extending inwardly from its periphery, means for rotating said disc about its center axis, a stationary blade mounted in parallel juxtaposition with respect to the surface of said cutting disc at the path of movement of said disc slot, and means for urging the portion of each bird that bears the oil bag into said disc at the path of movement of said disc slot, whereby the oil bag of each bird is received in the slot of the disc and is moved past the stationary blade and is cut from the bird with a scissors cut.

13. The apparatus of claim 12 and wherein the slot of said disc extends inwardly from the periphery of the disc in a direction extending on one side of the center axis of said disc, and wherein said means for rotating said disc comprises means for rotating said disc in the opposite direction about the center axis of said disc.

* * * * *